Oct. 11, 1927.
P. E. FENTON ET AL
1,645,500
DOUBLE PIN SOCKET
Filed March 7, 1927
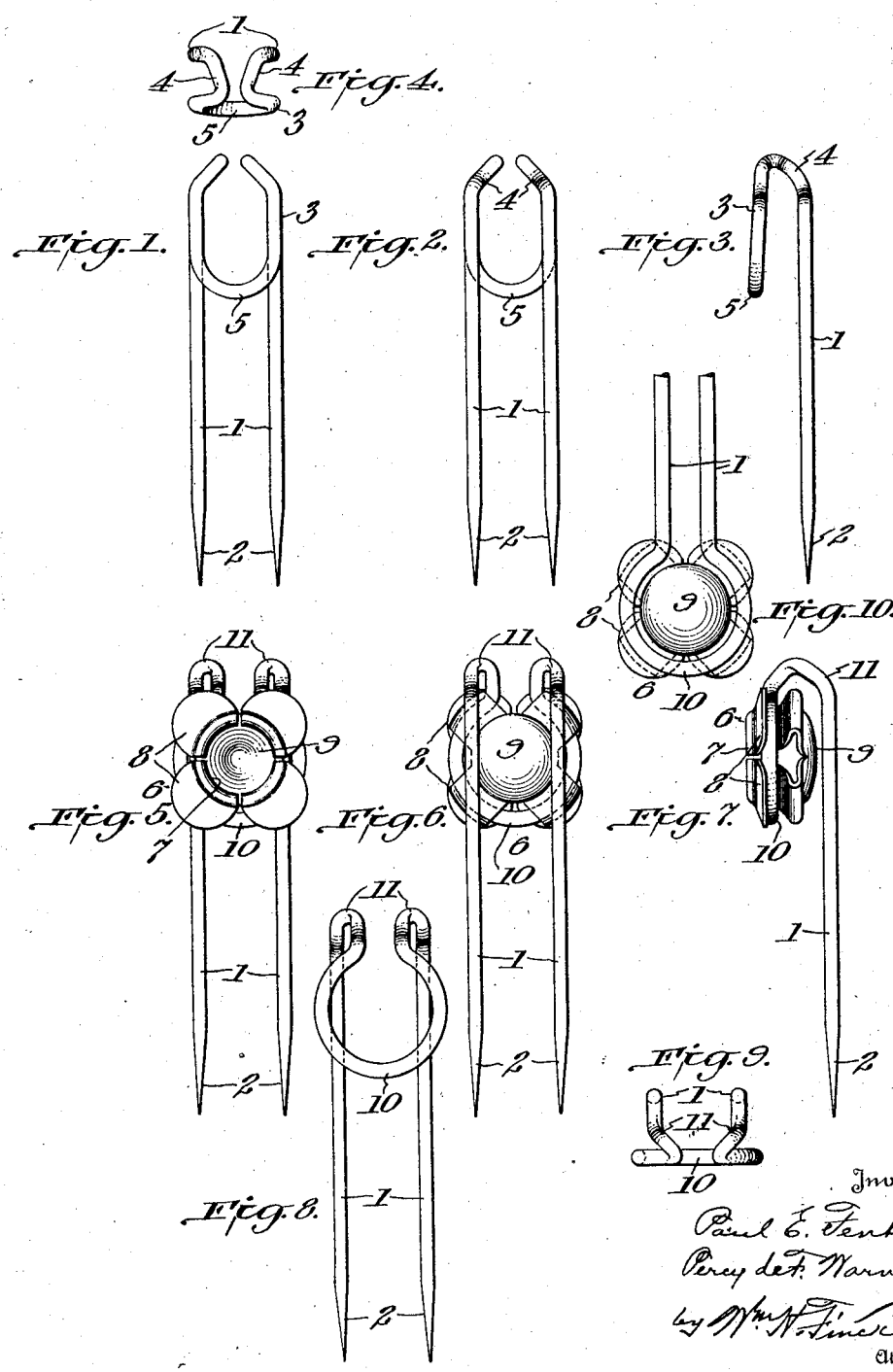
Inventors
Paul E. Fenton
Percy deF. Warner
by Wm N. Fincel
Attorney Patented Oct. 11, 1927.

1,645,500

UNITED STATES PATENT OFFICE.

PAUL E. FENTON, OF THOMASTON, AND PERCY DEF. WARNER, OF WATERBURY, CONNECTICUT, ASSIGNOR TO SCOVILL MANUFACTURING COMPANY, OF WATERBURY, CONNECTICUT, A CORPORATION OF CONNECTICUT.

DOUBLE-PIN SOCKET.

Application filed March 7, 1927. Serial No. 173,302.

The object of this invention is to adapt the looped or humped end of the double pointed pin of the Boden, King & Chapman Patent, No. 1,604,801, granted October 26, 1926, for use as a socket member of a snap fastener, and especially when such adaptation is designed for use as a pin fastener for attaching covers to upholstered automobile parts.

The invention consists in a double pointed pin of the type mentioned, having its upper ends converged so as substantially to close the looped portion and adapt such looped portion for use as a resilient socket for cooperation with a non-resilient or rigid stud or head to serve as a snap fastener; it being understood that instead of using the looped end itself as the resilient member, it may be used to support an attached resilient socket, as I will proceed now to explain and finally claim.

In the accompanying drawing illustrating the invention, in the several figures of which like parts are similarly designated, Figure 1 is a front elevation; Fig. 2 is a rear elevation; Fig. 3 is a side elevation, and Fig. 4 is a top plan view illustrating one embodiment of the invention. Fig. 5 is a front elevation; Fig. 6 is a rear elevation, and Fig. 7 is a side elevation illustrating the use of a modified form of the pin of the Boden, King & Chapman patent above mentioned in connection with an attached resilient socket member. Fig. 8 is a rear elevation, and Fig. 9 is a top plan view of the pin shown in Figs. 5, 6 and 7 detached. Fig. 10 is a rear elevation illustrating a preferred manner of uniting the pin and an attached socket.

Referring to the construction illustrated in Figs. 1 to 4 inclusive, the pin shown is of the double pointed variety, having the limbs 1 provided with pointed ends 2, a looped head or end 3 having the humped portions 4, and the bend 5. Differing from the pin of the Boden, King & Chapman patent mentioned, our pin has the humped portions 4 bent toward each other or converged, so as to close that end of the pin sufficiently to prevent the escape of the stud or head member.

As will be understood, the looped end is used as the socket member of the fastener, and it has sufficient resilience to permit yield to admit the stud or head member and when it is entered to snap back into secure engagement with the stud or head member, and also to permit the forcible withdrawal of the stud or head member when necessary or desirable.

The pin described may be utilized to support an attached resilient socket member, as shown in Figs. 5 to 7 and 10 inclusive. The socket member referred to and herein designated 6, is of the mushroom or collapsible type, slitted longitudinally, and having a stud or head-engaging portion 7, with surrounding base or flange elements 8, and the crown element 9, the base and the crown elements being slitted longitudinally to afford resilience, and to permit of the mushrooming or collapsing in order to secure the socket member to the pin. The pin, as before, has the limbs 1 pointed at 2, but the loop end 10 is substantially circular to conform to the circular character of the socket member. The humps 11 are bent inwardly so as more fully to encircle the socket member and secure its retention on the pin.

As already indicated, the socket member is mushroomed or collapsed in setting, and in order to facilitate the application of the setting tools thereto the pin is applied to the socket member before it is humped, as indicated in Fig. 10, and then the pin is humped as indicated in Figs. 5 to 9, and the article thus finished.

While the resilience of the pin may not be necessarily exerted in that form of the invention in which the socket member is attached, still it is obvious that undue strains may be compensated for by the resilience of the pin.

The invention is not limited to the use of the particular form of resilient socket member herein shown; and it is possible also to substitute a non-resilient socket member for the resilient socket member; and other variations in the details of the construction are permissible within the principle of the invention and the claims following.

What we claim is:—

1. A double pin socket, for use as a member of a snap fastener, comprising a double pointed pin having a looped and humped end, the humped portions of said end converging to more or less fully close that end of the pin and to permit the looped end to serve as a resilient member.

2. A double pin socket, for use as a member of a snap fastener, comprising a double pointed pin having a looped and humped end, combined with an added socket member embraced and held by the looped end of the pin.

3. A double pin socket, comprising a double pointed pin having a looped end, and a socket member mushroomed or collapsed within said looped end to effect a union of the pin and socket member.

4. A double pin socket, for use as a member of a snap fastener, comprising a double pointed pin having a looped and humped end, the humps bent inwardly, combined with an added socket member embraced and held by the looped end of the pin between the humps.

In testimony whereof we have hereunto set our hands this 4th day of March, A. D. 1927.

PAUL E. FENTON.
PERCY DeF. WARNER.